United States Patent [19]

Stein et al.

[11] 3,774,176

[45] Nov. 20, 1973

[54] SEMICONDUCTOR MEMORY HAVING SINGLE TRANSISTOR STORAGE ELEMENTS AND A FLIP-FLOP CIRCUIT FOR THE EVALUATION AND REGENERATION OF INFORMATION

[75] Inventors: Karl-Ulrich Stein; Aarne Sihling, both of Munich, Germany

[73] Assignee: Siemens Aktiengesellschaft, Berlin and Munich, Germany

[22] Filed: Sept. 11, 1972

[21] Appl. No.: 288,044

[30] Foreign Application Priority Data

Sept. 30, 1971 Germany .................. P 21 48 896.0

[52] U.S. Cl. ............. 340/173 R, 307/238, 307/246, 307/279, 340/173 FF, 340/173 CA

[51] Int. Cl. .......................... G11c 7/00, G11c 11/24

[58] Field of Search ................. 340/173 R, 173 AM, 340/173 FF, 173 CA; 307/238, 246, 279

[56] References Cited

UNITED STATES PATENTS 3,651,492 3/1972 Lockwood ..................... 340/173 R

*Primary Examiner*—Vincent P. Canney
*Assistant Examiner*—Stuart Hecker
*Attorney*—Benjamin H. Sherman et al.

[57] ABSTRACT

A dynamic semiconductor memory having a plurality of single transistor storage elements connected to a digit line and respective selection lines, an evaluation and regeneration circuit including a flip-flop having a pair of input/output points, each of the points connected to one of the digit lines, and means connecting the points including a controllable semiconductor switch operable to place the points at equal potentials prior to reading from a selected storage element.

12 Claims, 3 Drawing Figures

SEMICONDUCTOR MEMORY HAVING SINGLE TRANSISTOR STORAGE ELEMENTS AND A FLIP-FLOP CIRCUIT FOR THE EVALUATION AND REGENERATION OF INFORMATION

BACKGROUND OF THE INVENTION

1. Field of the Invention

The invention refers to a dynamic semiconductor circuit with single transistor storage elements, wherein each of the transistors have a control input which is connected to a selection arrangement having selection lines and having at least one digit line and having an evaluation and regeneration circuit connected to the digit line.

2. Description of the Prior Art

Semiconductor memories of the above-mentioned type are well known in the art. For example see the Aug. 2, 1971 issue of *Electronics*, Pages 69 to 75 and German Offenlegungsschrift 2,012,090. In these semiconductor memories the information which is stored as a charge in a capacitance is read by way of a transistor which is controlled by a selection arrangement. When reading the stored information a charge balance between the above-mentioned capacitance on the one hand and the capacitance of the digit line, as well as the input capacitance of the evaluation and regeneration circuit on the other hand will occur which results in a potential change on the digit line corresponding to the read information. The evaluation circuit comprises a read amplifier, an intermediate or temporary memory and a drive circuit and serves the purpose of reading and rewriting the information which was deleted by reading.

This circuit has a disadvantage in that a sensitive amplifier which is adapted with its threshold to the amplitude of the reading signal can only be realized with increased effort because of the manufacturing tolerances.

It is a further shortcoming of this circuit that a compensation of the interference signal which unavoidably occurs during the selection of the storage element is not possible.

SUMMARY OF THE INVENTION

It is therefore the primary object of this invention to eliminate the disadvantages of the prior art circuits.

As was initially mentioned this object is fulfilled by means of a dynamic semiconductor memory which, according to the invention, is characterized in that a flip-flop circuit is provided as the evaluation and regeneration circuit, whereby the two input and output points of the flip-flop circuit are electrically connected with each other by at least one controllable semiconductor circuit.

Preferably, transistors are provided as semiconductor circuits which can be controlled in their electric conductivity, particularly field effect transistors.

According to a special embodiment of the invention, two controllable semiconductor circuits are provided in a flip-flop circuit as an evaluation and regeneration circuit, which controllable semiconductor circuits are connected with respect of the input or output points, respectively, of this flip-flop circuit electrically in a sequence with each other, wherein a terminal to which a prescribed electrical potential can be connected is located between the two semiconductor switches of the flip-flop circuit.

According to a further development of the invention, the two input or output points, respectively, of the evaluation and regeneration circuits which are designed as flip-flop are each connected to a digit line which is provided with storage elements. Therefore, and preferably, a double utilization of the provided evaluation and regeneration circuit is achieved. In order to achieve at each of the two points of a flip-flop circuit construction according to the invention an equally large reading signal when selecting a storage element of one or the other digit line, both points are charged with almost equally large digit line capacity and, preferably an equal number of storage elements is connected to both digit lines.

For a semiconductor memory a prescribed amount of single transistor storage elements with selection and digit lines and with the respective evaluation and regeneration circuits can be constructed together as a single unit. The combining of circuits into one unit is technically of particular interest with respect to integrated semiconductor technology. With this technique, a large number of storage elements, the circuit elements and conductor paths of the evaluation and regeneration circuits, the selection and digit lines as well as the selection arrangement are constructed together on a single semiconductor chip. Further details of integrated circuit techniques are known from the state of the art.

BRIEF DESCRIPTION OF THE DRAWINGS

Other objects, features and advantages of the invention will be best understood from the following detailed description, taken in conjunction with the accompanying drawings, on which.

DESCRIPTION OF THE PREFERRED EMBODIMENTS

Figure 1:
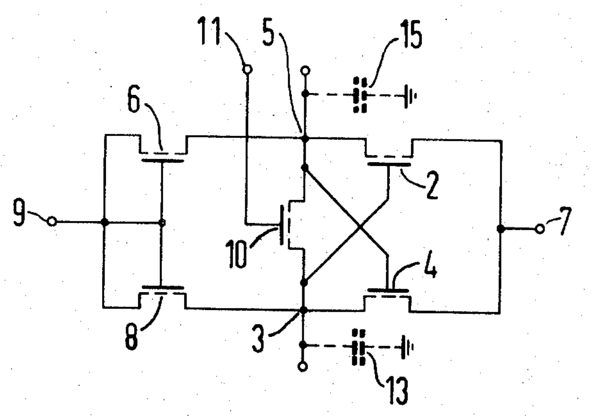
FIG. 1 is a schematic diagram of a flip-flop circuit provided for an evaluation and regeneration circuit, according to the invention, with a semiconductor switch with a control terminal.

Basically, the flip-flop circuit of FIG. 1 comprises two switching transistors 2 and 4 and respective load impedances 6 and 8, which in this case are designed as field effect transistors having gate terminals which are connected with the drain electrode of the field effect transistors. A pair of terminals 3 and 5 designate the input or output points, respectively, of the flip-flop circuit at which signals can be fed into the flip-flop circuit and output signals can be read from the flip-flop circuit.

According to a feature of the invention, in case of one sample embodiment, a transistor 10 is provided as an electrical semiconductor switch between the points 3 and 5. The semiconductor switch is, preferably, a field effect transistor with a gate electrode 11. In case of the electrically conductive condition of the switch 10, the points 3 and 5 are electrically connected with each other and are, therefore, necessarily at approximately the same potential. In the electrically blocked condition of the transistor 10, the points 3 and 5 can, as is typical for a flip-flop circuit, adopt two stable conditions which are complementary to each other, if a corresponding electric supply voltage is connected to the terminals 7 and 9 of the flip-flop circuit. The switching of transistor 10 from one into the other condition is caused by application of a respective potential to terminal 11, the gate electrode of the field effect transistor. Due to the electrical short circuit between the points 3 and 5 the flip-flop circuit is forced into a point of operation which constitutes the unstable balance condition between the two stable conditions of the flip-flop circuit.

Figure 2:
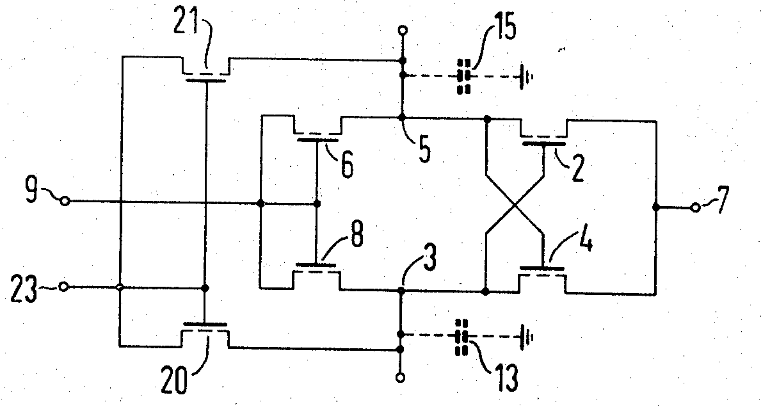
FIG. 2 is a schematic diagram showing a corresponding flip-flop circuit with two semiconductor switches and an intermediate terminal and a control terminal.

FIG. 2 illustrates another form of the sample embodiment of the evaluation and regeneration circuit for a memory according to the invention. Details of this figure which coincide with details of FIG. 1, have been provided with the same reference numerals. The reference numerals 20 and 21 designate two semiconductor switches. Again, field effect transistors are provided as the semiconductor switches, whose gate electrodes are connected with each other and with the drain electrodes. Between the two switches 20 and 21, which with respect to the points 3 and 5 are arranged in a sequence, an electrical terminal 23 is provided in the circuit, to which an electrical potential can be applied. If the switches 20 and 21 are in an electrically conductive condition the points 3 and 5 are forced to a coinciding potential as was described in connection with FIG. 1. In the sample embodiment according to FIG. 2 the points 3 and 5 adopt the potential applied to terminal 23. Therefore, the points 3 and 5 can be charged with a prescribed potential which is equal for the points 3 and 5 and which, depending on the magnitude of the potential at terminal 23, differs from the potential of the above-described unstable balance condition of the flip-flop circuit. Thus, a threshold value can be adjusted for the reading voltage which occurs at point 3 or at the point 5.

Figure 3:
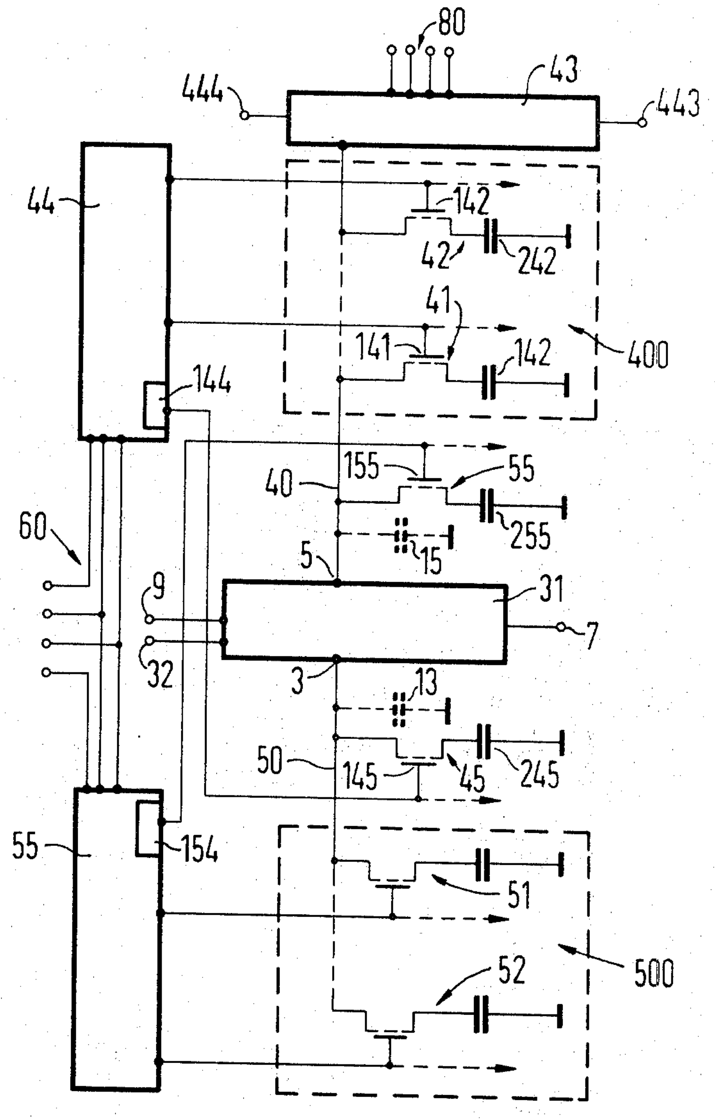
FIG. 3 is a schematic diagram of a memory having an evaluation and regeneration circuit, with two digit lines with storage elements and dummy elements for interference compensation and with two selection arrangements, a word decoder and a bit decoder.

FIG. 3 shows a further sample embodiment of a memory according to the invention. An evaluation and regeneration circuit 31, as described in greater detail in FIGS. 1 and 2, is shown in block form.

The details in FIG. 3, which were already described in connection with FIGS. 1 and 2, have the same reference characters. The terminal 32 is, depending on whether a flip-flop circuit according to FIG. 1 or according to FIG. 2 is provided, equal to terminal 11 or terminal 23. According to this embodiment, a digit line 40 and a digit line 50 are connected to each of the respective points 3 and 5 of the evaluation and regeneration circuit 31. A number of single transistor storage elements of a storage element field 400 are connected to the digit line 40 and are connected in parallel with each other with respect to ground. In FIG. 3 only the two storage elements 41 and 42 are illustrated for the field 400. As was already mentioned above, and as is known from the state of the art, a storage element comprises a transistor 141, 142 . . . and a capacitance 241, 242 . . . , into which the written signal is stored. The reference numeral 43 denotes a generally known bit decoder which is connected to the end of the digit line 40 and which, depending on the particular structure, serves for the selection of one or a group of digit lines. The reference numeral 44 designates a word decoder, whose outputs are connected with the gate electrodes of the transistors 41, 42 . . . of the storage elements of field 400.

The word decoder 44, in addition, contains a generally known logic circuit 144, whose output, according to a special further development of the invention, is connected with the gate electrode of a transistor 145. Together with the capacity 245 this transistor 145 forms a dummy element 45 which will be described later on and which, in its structure, resembles the structure of a storage element 41, 42 . . . .

The capacitance 13 refers to the circuit capacity in the circuit of circuit 31 at point 3. Basically this capacity is provided by the connected digit line.

A further digit line 50 is connected to point 3 of the evaluation and regeneration circuit. This digit line 50 is connected with a number of storage elements of a field 500 of which the two storage elements 51 and 52 are illustrated. Preferably, the number of the storage elements which are connected to the digit line 50 equals the number of storage elements which are connected to digit line 40. Therefore, the capacitive load of the circuit 31 at point 5 is equal to that at point 3. A word decoder 54 is provided for the storage elements 51, 52 . . . . The word decoder 54 is connected with the gate electrodes of the switching transistors of the respective storage elements. The word decoder 54 contains, in addition a generally known logic circuit 154, which in function corresponds to the logic circuit 144 and whose output is connected with the gate electrode of a switching transistor 155. Together with the capacitance 255 the switching transistor 155 forms a dummy element 55, which is identical with the storage elements 51, 52 . . . and which in its function corresponds to the dummy element 45. The circuit capacitance of the evaluation and regeneration circuit which occurs at point 5 is referenced 15. The lines and terminals 60 for the word addresses, which are only partially illustrated, are connected to the word decoders 44 and 54. The terminals 80 for the bit address, which are only partially illustrated are connected to the bit decoder 43. For reading from one of the storage elements, for example the storage element 41, the transistor 141 is switched to its electrically conductive condition by a signal from the word decoder 44. The charge which is stored in the capacitance 241 thereby distributes to the capacity 241 and the switching circuit capacitance 15 of the evaluation and regeneration circuit 31. By means of this reading signal, which occurs during reading at the switching capacitance 15, operation of the flip-flop circuit into the respective stable condition is caused, initiated from the operation point which was previously adjusted by the transistor 10 or 20, 21, as the case may be, of the evaluation and regeneration circuit, according to the polarity of the reading signal. This flip-flop operation does not only supply the logical signal at the data output 443 of the bit decoder 43, but also causes a regeneration of the capacitance 241 to its previous charge value.

The reading procedure which was described for the storage element 241 can be carried out in the same way with any other storage element.

By the adjustment of the operation point already very small reading signals can be evaluated according to the concept of the present invention.

During reading of one of the storage elements 41, 42 . . . of the field 400, the transistor 145 of the dummy element 45 with the transistor 145 and the capacity 245 is switched according to the above embodiment of the invention simultaneously with the initiation of the storage element of field 400 by the logic circuit 144 to become electrically conductive. In case of this special embodiment of the invention, the evaluation and regeneration 31 is charged at points 3 and 5 with an equally large capacitance 245 and the, for example, selected capacitance 241. The interference signal initiated by the dummy element and occurring at point 3 compliments the interference signal which, for example, is initiated by the storage element which is to be read and occurs at point 5, whereby this interference signal is superposed on the intelligence signal of the storage element 41. This advantageous embodiment of the invention makes it possible to largely exploit the influence of interference signals. Now, even smaller reading signals can be evaluated which makes an advantageous reduction of the value of the storage capacities possible (for example 241). As was already mentioned above it is a very substantial advantage of the invention that by means of control of the transistor 10, or of the transistors 20 and 21, respectively, the operation point of the flip-flop circuit of the evaluation circuit can be brought to a prescribed and equal potential at points 3 and 5 shortly before the signal which is to be read is received in the evaluation and regeneration circuit, particularly in case of an embodiment according to FIG. 1 to the point of the unstable balance between the two stable conditions of the flip-flop circuit and, in case of a sample embodiment according to FIG. 2 to an operation point which is determined by the prescribed potential at the terminal 23.

Before the reading process starts, preferably directly before the reading process, the transistor 10 or the transistors 20 and 21, respectively, are again switched to their nonconductive conditions. In this state the possibility exists for the flip-flop circuit that the potentials of points 3 and 5 which before were substantially equal, change with respect to each other. However, the change of the potentials at points 3 and 5 is first counteracted to a certain degree by the capacitances 13 and 15.

Due to the occurrence of a reading signal at point 3, or at point 5, the flip-flop circuit is operated into one of the two stable states depending on the polarity of the reading signal, whereby the transistor 10 or the transistors 20 and 21, respectively, are already blocked at the time of arrival of these reading signals. Otherwise, the reading would become impossible due to the short circuit between the points 3 and 5.

According to a preferred further development of the operational procedure of a memory arrangement according to the invention, the points 3 and 5 are first of all brought to an almost even potential before reading of the information which is, for example, stored in element 41. This is caused by the switching of transistor 10 or transistors 20 and 21, respectively, into the conductive condition. Simultaneously, a signal is created by the logic circuit 144 which is located in the word decoder 44, which signal switches the transistor 145 of the dummy element 45 into the conductive condition. A charging of the storage capacitance 245 to the potential of point 3 is thereby achieved.

Upon charging, the transistor 145 is again switched into the non-conductive condition by a respective signal. Simultaneously, or at certain time intervals, the potentials at the terminals 7 and 9 of the flip-flop circuit are changed in such a way that the flip-flop circuit does not show a current acceptance at these terminals.

After this state has been achieved, the transistor 10, or the transistors 20 and 21, respectively, are switched by means of a corresponding signal into the blocked conditions. Upon switching off the potential of points 3 and 5 is stored by the connected switching circuit capacitances 13 or 15, respectively, until during the initiation of the reading process, or writing process, respectively, potential changes are caused at the points 5 and 3 by the intelligence and interference signals occurring in the digit lines 40 and 50.

At the beginning of the reading process the transistor 141 of the storage element 41 is switched into the conductive condition by a signal emitted from the word decoder 44, whereby a charge balance is introduced between the storage capacitance 241 and the switching circuit capacitance 15. Depending on the previous charge condition of the storage capacitance 241, this will lead to an increase or decrease of the potential, constituting the information content, whereby this potential was previously adjusted according to the invention at point 5 and was stored by the switching circuit capacitance 15. A certain part of the occurring potential change is thereby caused due to the reading of the unavoidably occuring interference signal.

Simultaneously with the above described switching process at transistor 141, the transistor 145 of the dummy element 45 is also switched into the conductive condition by a respective signal released from the logic circuit 144, whereby a charge balance is introduced between the storage capacitance 245 and the switching circuit capacitance 13. Since due to the previously described charging process of the storage capacitance 245, almost no potential difference existed between the storage capacitance 245 and the switching circuit capacitance 13, previous to the reading process, and a load balance which takes place at this point is merely caused by the interference signal, whereby this charge balance causes at the point 3 an almost similarly large and equally directed potential change as is caused by the selection interference signal at the point 5.

The difference voltage which exists after the termination of the reading process between the points 3 and 5 therefore only constitutes the desired intelligence signal.

If this difference voltage has reached a certain level due to the threshold level of the flip-flop circuit provided according to the invention, the flip-flop circuit is activated by changing the potential of the terminals 7 and 9 to the original values and, thus, the flip-flop operation is initiated.

Since during the duration of this flip-flop operation especially the transistor 141 of the storage element 41 is in a conductive state, a charging or discharging takes place simultaneously via the digit line 40, regenerating the previously existing charge condition of the storage capacitance 241.

Upon achieving the stable condition of the flip-flop circuit corresponding to the read information, the transistors 141 and 145 are switched by respective signals of the word decoder 44 or the logic circuit 144, respectively, into the blocked condition and the read information can be received as a current or as a logical voltage level at output 443 of the bit decoder. It should be pointed out that the dummy element 45 can also be switched off already after the initiation of the flip-flop operation of the flip-flop circuit of the evaluation and regeneration circuit 31 by blocking the transistor 145 of the dummy element 45.

The entire above described operation also applies for all other storage elements of the memory according to the invention, for example also for the storage field 500 with the dummy element 55 which is provided for the field 500.

The feeding of an information takes place by a basically similar operation whereby the information at the data input 444 is switched during the period, which is described above as a reading process, via the bit decoder 43 to the digit line 40 which may be selected.

While we have described our invention by reference to a particular illustrated embodiment, many changes and modifications may be made to our invention without departing from the true spirit and scope thereof, and it is to be understood that we intend to include within the patent warranted hereon all such changes and modifications as may reasonably and properly be included within the scope of our contribution to the art.

We claim:

1. A dynamic semiconductor memory comprising: a plurality of transistor storage elements, each of said elements comprising a transistor having a control input; a selection device comprising a plurality of selection lines connected to respective ones of said control inputs and a digit line connected to each of said transistor storage elements; an evaluation and regeneration circuit including a flip-flop circuit having a pair of input points one of which is connected to said digit line; and at least one controllable semiconductor switch connected between said points operable to place said points at the same potential.

2. The invention according to claim 1, wherein said semiconductor switch comprises a transistor.

3. The invention according to claim 2, wherein said transistor is a field effect transistor.

4. The invention according to claim 1, comprising two semiconductor switches connected in series between said points, wherein a terminal to which an electrical potential can be applied is located between the two switches.

5. The invention according to claim 1, wherein said storage elements, said evaluation and regeneration circuit, said semiconductor switch are constructed as integrated circuits.

6. The invention according to claim 1, comprising a second plurality of storage elements, each including a transistor having a control input, a second selection device having a plurality of selection lines connected to respective control inputs and a second digit line connected to each of said storage elements of said second plurality and to the other of said points.

7. The invention according to claim 6, wherein the same number of storage elements is connected to each of said digit lines and both digit lines and said storage elements are designed identical.

8. The invention according to claim 6, comprising a pair of dummy storage elements connected to respective digit lines, each having a control input connected to a selection line of the selection device associated with the other digit line.

9. The invention according to claim 8, comprising means in each of said selection devices for shifting the selection of said dummy elements with respect to the selection of said storage elements.

10. The invention according to claim 8, comprising a plurality of said evaluation and regeneration circuits and respective connected digit lines are constructed as a single unit.

11. The invention according to claim 1, comprising means for operating said controllable semiconductor switch to connect said points and bring said points to the same potential prior to reading and to interrupt the connection immediately prior to and maintaining the interruption during reading.

12. The invention according to claim 11, wherein said flip-flop circuit has a capacitance, comprising means for blocking said flip-flop and then unblocking said flip-flop after charging the capacitance with a charge representative of the information read from a selected storage element.

* * * * *